May 15, 1956     O. H. SCHELDORF     2,745,169
METHOD FOR SUPPORTING A CYLINDER ASSEMBLY ON A COMPRESSOR FRAME
Filed April 23, 1953
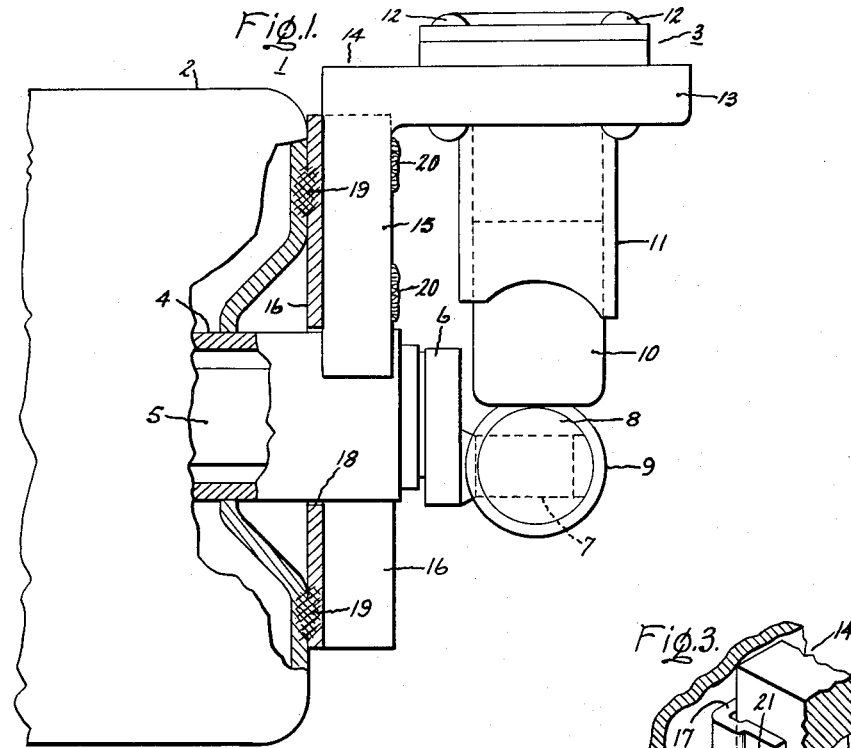
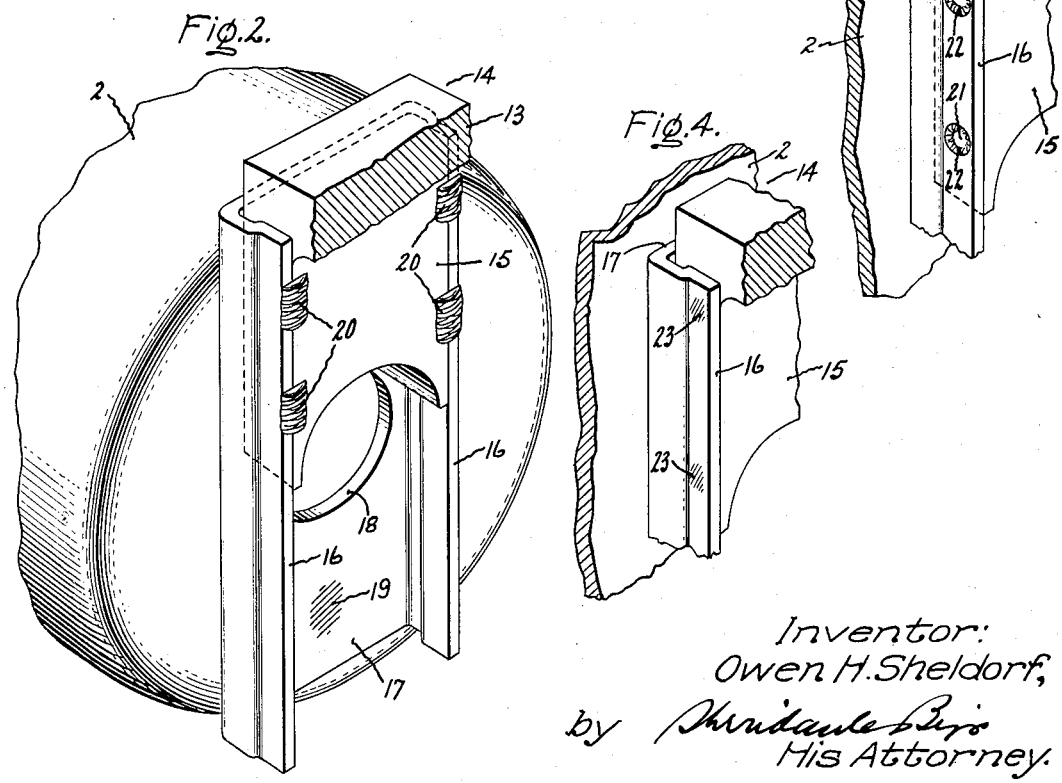
Inventor:
Owen H. Sheldorf,
by *Sheridan & Ross*
His Attorney.

United States Patent Office 2,745,169
Patented May 15, 1956

2,745,169

METHOD FOR SUPPORTING A CYLINDER ASSEMBLY ON A COMPRESSOR FRAME

Owen H. Scheldorf, North East, Pa., assignor to General Electric Company, a corporation of New York Application April 23, 1953, Serial No. 350,573

2 Claims. (Cl. 29—150)

My invention relates to a method of making refrigerant compressors and pertains more particularly to refrigerant compressors of the fabricated type.

In constructing compressors of the fabricated type, it is generally preferable to employ welding wherever possible for joining elements to be permanently secured together. This general preference for welding is due to the relative speed and facility with which the elements can be joined. It is due further to the fact that welding minimizes the need for and the expense in providing fastening devices such as screws, bolts, etc. Still further, welding minimizes relative movement between the elements joined which might result in noise and a reduction of stability. The welding of certain elements in a fabricated type compressor, however, has presented problems such as distortion in the elements joined and resultant misalignment of operating components in the compressor. This is particularly so in the case of welding a cylinder assembly to the frame of a Scotch-Yoke compressor. In this type of compressor the cylinder assembly usually comprises a cylinder suitably secured to a bracket of subtantial thickness adapted for being welded to the frame of the compressor which is comparatively thinner. Attempts to weld such elements directly generally result in distortion of the frame and consequent misalignment of the cylinder with respect to the compressor piston adapted for operating therein, as well as possible binding of the drive shaft in the frame bearings.

Accordingly, the primary object of my invention is to provide a new and improved means and method for minimizing distortion in the welding of elements of different thicknesses.

Another object of my invention is to provide in a fabricated refrigerant compressor including a drive shaft, a frame and a cylinder assembly, a new and improved means and method for securing the cylinder assembly to the frame with assurance of satisfactory alignment of the cylinder with respect to a piston adapted for operating therein, and for minimizing the possibilty of binding of the drive shaft in the frame bearings.

Another object of my invention is to provide in a fabricated refrigerant compressor including a reciprocable piston, a frame and a cylinder assembly comprising a cylinder for cooperating with the piston and a bracket for supporting the cylinder, a new and improved means and method for securing the bracket to the frame and easily obtaining a satisfactory head clearance between the piston and cylinder.

Further objects and advantages of my invention will become apparent as the following description proceeds and the features of novelty which characterize my invention will be pointed out with particularity in the claims annexed to and forming part of this specification.

In carrying out the objects of my invention I provide a compressor frame. Locally welded to the frame and formed of material of substantially the same thickness as the frame is a pair of spaced apart rails. Positioned between the rails and locally welded thereto is a cylinder bracket substantially thicker than the material of the rails.

For a better understanding of my invention reference may be had to the accompanying drawing in which:

Fig. 1 is a fragmentary elevation view of a Scotch-Yoke compressor incorporating the preferred embodiment of my invention;

Fig. 2 is a fragmentary perspective view illustrating details of my invention;

Fig. 3 is a fragmentary perspective view of a modified form of the preferred embodiment of my invention; and Fig. 4 is a fragmentary perspective view illustrating another modified form of the preferred embodiment of my invention.

In Fig. 1 is fragmentarily shown a refrigerant compressor of the fabricated Scotch-Yoke type and generally designated 1. The compressor 1 includes a frame 2 and a cylinder assembly 3. The frame 2 is cup-like in construction and adapted for housing a portion of and being secured to a drive motor (not shown). Secured concentrically in the frame 2 and extending therethrough is a bearing sleeve 4 adapted for housing a self-aligning bearing (not shown) in which is journaled a drive shaft 5.

Formed on the outer extremity of the drive shaft 5 is a shoulder 6. Eccentrically fitted in the shoulder 6 is a crank pin 7. The crank pin 7 cooperates with a cylindrical cross slide 8 horizontally slidable in a cylindrical yoke 9. The yoke 9 is suitably secured as by welding and brazing to a piston 10. In this arrangement rotation of the drive shaft 5 causes circular travel of the crank pin 7 which in turn horizontally reciprocates the cross slide 8 for effecting through the yoke 9 vertical reciprocation of the piston 10. This is the piston operating arrangement found in all Scotch-Yoke compressors.

Provided for receiving and having the piston 10 operate therein is a cylinder 11, one of the elements comprising the above-mentioned cylinder assembly 3. The cylinder 11 is suitably secured as by a plurality of elements 12 to the horizontal leg 13 of an inverted L-shaped bracket 14 which is substantially thicker than the frame 2. As seen in Fig. 2, the vertical leg 15 of the bracket 14 is disposed between a pair of spaced apart rails 16 extending parallel to the direction of reciprocation of the piston 10. In the present arrangement the piston 10 reciprocates vertically and the rails 16 extend vertically. The rails 16 are preferably formed of material of substantially the same thickness as the material of the frame 2. Additionally, the rails may be formed separately or as the side portions of a channel member 17 in the manner shown in Fig. 2. As seen in both Figs. 1 and 2, the channel member 17 is formed with an aperture 18 for permitting extension of the bearing sleeve 4 through the channel member. As also seen, the channel member 17 is secured to the frame 2 by a plurality of local or spot welds indicated by 19. Any distortion resulting from these local welds will be small and tolerable.

In the preferred form of my invention I mount the cylinder assembly 3 on the frame 2 by first positioning the vertical leg 15 of the bracket 14 between the rails 16 and against the base of the channel 17 at a vertical position satisfactory for affording a desired head clearance between the piston 10 and the cylinder 11. Then I secure the bracket 14 in this position by effecting a plurality of local welds indicated by 20 along the outer edges of the vertical leg 15 of the bracket and the corresponding edges of the rails 16. Thus, I effectively localize welding stresses in the elements joined and cause such stresses to be imposed through the edgewise and stronger sections of the rails which minimizes distortion or displacement thereof. As seen in Figs. 1 and 2, I prefer effecting two spaced apart welds 20 of approximately 5/8" in length on either side of the bracket.

During welding of the rails to the bracket these elements heat up at different rates owing to the difference in the thicknesses thereof. The rails, since they are thinner heat up faster than the bracket and, although the stresses imposed in the rails are through the edgewise or stronger sections, there is some expansion of the rails edgewise or outwardly from the frame 2. Consequently, upon cooling the rails 16 contract edgewise or inwardly toward the frame 2 and draw the vertical leg 15 of the bracket 14 firmly into engagement with the base portion of the channel member 17. Thus relative movement between adjacent surfaces of the bracket and the channel member, which could result in noise and a reduction in stability, is minimized.

A modified form of my invention illustrated in Fig. 3 is similar to the above-described preferred embodiment in that it includes the frame 2, the channel member 17 including a pair of spaced apart rails 16 (only one of which is shown) and the bracket 14 to be locally welded to the channel member between the rails. The modified form of Fig. 3 and the method of constructing it differs, however, in the manner in which the rails 16 are locally welded to the bracket 14. As seen in Fig. 3, the rails 16 may each be formed with a plurality of apertures 21. I prefer forming two apertures 21 in each of the rails 16. After the vertical leg 15 of the bracket 14 has been positioned between the rails to a vertical position affording satisfactory head clearance between the piston 10 and the cylinder 11 carried by the bracket, I effect a weld indicated by 22 between the inner edge of each of the apertures 21 and the corresponding side of the vertical leg 15 of the bracket 14. In this manner I obtain welds of sufficient strength for securing the bracket between the rails. Additionally, in this manner I effectively localize welding stresses in the elements joined and cause such stresses to be imposed through the edgewise and stronger sections of the rails whereby distortion resulting from such stresses is minimized. In the modified form, as in the first-described embodiment, the difference in the thicknesses of the rails 16 and the bracket 14 cause the rails to heat up more quickly than the bracket during the welding process and to expand somewhat edgewise. As also in the first embodiment, subsequent cooling and edgewise contraction of the rails effects a drawing of the vertical leg 15 of the bracket 14 firmly into engagement with the base portion of the channel member 17 for minimizing noise and insuring stability.

Another modified form of my invention is illustrated in Fig. 4 and is similar to the preferred embodiment and the modification described above in that it too includes the frame 2, the channel member 17 including a pair of spaced apart rails 16 (only one of which is shown) and the bracket 14 adapted for being locally welded to the channel member between the rails. In this form, however, the rails 16 are spot or resistance welded to the vertical leg 15 of the bracket 14. After the bracket 14 has been so positioned vertically between the rails 16 for providing a prescribed head clearance between the piston 10 and the cylinder 11 secured to the horizontal leg 13 of the bracket, I employ suitable resistance welding apparatus for effecting spot or resistance welds indicated by 23 between the rails and corresponding sides of the bracket. As seen in Fig. 4, I prefer effecting two such welds between each rail 16 and the corresponding side of the bracket 14. Thus the bracket is secured in position and the welding stresses are localized and caused to be imposed through the edgewise sections of the rails for minimizing distortion thereof.

In the present modification as in the first embodiment and the modification thereof described above the rails heat up more quickly than the bracket and expand somewhat edgewise. In cooling, the rails contract edgewise and draw the vertical leg of the bracket into firm engagement with the base portion of the channel member thereby to minimize noise and insure stability.

It will be seen that I have provided an arrangement and method for minimizing distortion in the welding of elements of different thicknesses. It will be seen further that I have provided in a fabricated refrigerant compressor including a shaft, a frame and a cylinder assembly, an arrangement and method for securing the cylinder assembly to the frame with assurance that the bore of the cylinder will be satisfactorily aligned with respect to the compressor piston adapted for operating in the cylinder and in such a manner as to minimizing the possibility of the shaft binding in the frame bearings. It will be seen still further that by my means and method satisfactory head clearance between the piston and cylinder may be more easily obtained.

While I have shown and described a specific embodiment of my invention and two modifications thereof, I do not desire my invention to be limited to the particular forms shown and described and I intend by the appended claims to cover all modifications within the spirit and scope of my invention.

What I claim as new and desire to secure by Letters Patent of the United States is:

1. In the construction of a compressor of the fabricated type including a reciprocable piston, a frame, and an assembly including a bracket of greater thickness than said frame and carrying a cylinder for cooperating with said piston, the method of securing said bracket to said frame by welding with a minimum of distortion and obtaining a satisfactory head clearance between and alignment of said piston and cylinder comprising the steps of locally welding at spaced points to said frame a channel member of substantially the same thickness as said frame and including a pair of spaced apart rails extending parallel to the direction of reciprocation of said piston and outwardly from said frame, disposing said bracket between said rails and against the base of said channel member at a position affording satisfactory head clearance between said piston and cylinder, and locally welding the outer edges of said rails to said bracket at spaced points, said rails heating up and expanding edgewise during welding and being effective upon cooling for contracting edgewise and thereby drawing said bracket firmly into engagement with said base of said channel member.

2. In the construction of a compressor of the fabricated type including a reciprocable piston, a frame and an assembly including a bracket of greater thickness than said frame and carrying a cylinder for cooperating with said piston, the method of securing said bracket to said frame by welding with a minimum of distortion and obtaining a satisfactory head clearance between and alignment of said piston and cylinder comprising the steps of locally welding to said frame the base of a channel member of substantially the same thickness as said frame and including a pair of spaced apart rails extending outwardly from said frame and parallel to the direction of reciprocation of said piston, disposing said bracket between said rails and against the base of said channel member at a position affording satisfactory head clearance between said piston and cylinder, and locally welding at spaced points the outer edges of said rails to the corresponding outer edges of said bracket, said rails heating up and expanding edgewise during welding and being effective upon cooling for contracting edgewise and thereby drawing said bracket firmly into engagement with said base of said channel member.

References Cited in the file of this patent

UNITED STATES PATENTS

| | | |
|---|---|---|
| 1,593,783 | Stresau | July 27, 1926 |
| 2,248,410 | Moeller | July 8, 1941 |
| 2,272,283 | Widgren | Feb. 10, 1942 |
| 2,596,762 | Costner | May 13, 1952 |